(12) United States Patent
Takatani et al.

(10) Patent No.: US 12,215,401 B2
(45) Date of Patent: Feb. 4, 2025

(54) GRAIN-ORIENTED ELECTRICAL STEEL SHEET

(71) Applicant: NIPPON STEEL CORPORATION, Tokyo (JP)

(72) Inventors: Shinsuke Takatani, Tokyo (JP); Yoshihiro Arita, Tokyo (JP); Shunsuke Okumura, Tokyo (JP); Shohji Nagano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/422,048

(22) PCT Filed: Jan. 16, 2020

(86) PCT No.: PCT/JP2020/001183
§ 371 (c)(1),
(2) Date: Jul. 9, 2021

(87) PCT Pub. No.: WO2020/149342
PCT Pub. Date: Jul. 23, 2020

(65) Prior Publication Data
US 2022/0119906 A1    Apr. 21, 2022

(30) Foreign Application Priority Data

Jan. 16, 2019  (JP) .................................. 2019-005475

(51) Int. Cl.
*C22C 38/00* (2006.01)
*C21D 8/02* (2006.01)
(Continued)

(52) U.S. Cl.
CPC ............. *C21D 9/46* (2013.01); *C21D 8/0257* (2013.01); *C21D 8/1222* (2013.01);
(Continued)

(58) Field of Classification Search
None
See application file for complete search history.

(56) References Cited

U.S. PATENT DOCUMENTS 3,856,568 A    12/1974  Tanaka et al.
5,782,998 A *   7/1998  Ushigami ............ C21D 8/1283
148/113

(Continued)

FOREIGN PATENT DOCUMENTS

EP    3 385 397 A1    10/2018
EP    3 653 751 A1     5/2020
(Continued)

OTHER PUBLICATIONS

Gloss Measurement Conversion to Other Angles 3 ; Jim Roberts; Measure What You See Color and Appearance Concepts Explored; Jul. 10, 2015 ;https://measurewhatyousee.com/2015/07/10/gloss-measurement-conversion-to-other-angles/ (Year: 2015).*

(Continued)

*Primary Examiner* — Humera N. Sheikh
*Assistant Examiner* — Elizabeth D Ivey
(74) *Attorney, Agent, or Firm* — Birch, Stewart, Kolasch & Birch, LLP

(57) ABSTRACT

A grain-oriented electrical steel sheet of the present invention has a base steel sheet, an amorphous oxide layer formed on the base steel sheet, and a tension-insulation coating formed on the amorphous oxide layer, in which the base steel sheet contains, as a chemical composition, by mass %, C: 0.085% or less, Si: 0.80 to 7.00%, Mn: 1.50% or less, acid-soluble Al: 0.065% or less, S: 0.013% or less, Cu: 0 to 0.80%, N: 0 to 0.012%, P: 0 to 0.50%, Ni: 0 to 1.00%, Sn: 0 to 0.30%, and Sb: 0 to 0.30%, a remainder is Fe and an impurity, a surface glossiness Gs20(A) in a direction parallel to a rolling direction is 2.0 to 70, and a surface glossiness (Continued)

Gs20(B) in a direction perpendicular to the rolling direction is 2.0 to 70.

5 Claims, 2 Drawing Sheets

(51) Int. Cl.
    *C21D 8/12*     (2006.01)
    *C21D 9/46*     (2006.01)
    *C22C 38/02*     (2006.01)
    *C22C 38/04*     (2006.01)
    *C22C 38/06*     (2006.01)
    *C22C 38/08*     (2006.01)
    *C22C 38/16*     (2006.01)
    *C22C 38/60*     (2006.01)

(52) U.S. Cl.
    CPC .......... *C21D 8/1233* (2013.01); *C21D 8/1272* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/16* (2013.01); *C22C 38/60* (2013.01); *C21D 2201/05* (2013.01)

(56) References Cited

U.S. PATENT DOCUMENTS

| | | | |
|---|---|---|---|
| 5,961,744 A | 10/1999 | Yamazaki et al. | |
| 2002/0007870 A1* | 1/2002 | Ohata | C22C 38/06 148/111 |
| 2003/0180553 A1* | 9/2003 | Shigesato | C21D 8/1288 427/127 |
| 2005/0217761 A1* | 10/2005 | Ushigami | C21D 8/1283 148/111 |
| 2013/0061985 A1* | 3/2013 | Iwanaga | C22C 38/02 148/208 |

FOREIGN PATENT DOCUMENTS

| | | | |
|---|---|---|---|
| EP | 3 653 753 A1 | 5/2020 | |
| EP | 3 653 754 A1 | 5/2020 | |
| EP | 3 653 756 A1 | 5/2020 | |
| JP | 48-39338 A | 6/1973 | |
| JP | S62151514 A * | 7/1987 | .......... C21D 8/1294 |
| JP | 6-184762 A | 7/1994 | |
| JP | 7-118750 A | 5/1995 | |
| JP | 7-278670 A | 10/1995 | |
| JP | 7-278833 A | 10/1995 | |
| JP | 9-78252 A | 3/1997 | |
| JP | 11-106827 A | 4/1999 | |
| JP | 2002-322566 A | 11/2002 | |
| JP | 2002-348643 A | 12/2002 | |
| JP | 2002-363763 A | 12/2002 | |
| JP | 2003-268450 A | 9/2003 | |
| JP | 2003-293149 A | 10/2003 | |
| JP | 2003-313644 A | 11/2003 | |
| JP | 2014-208907 A | 11/2014 | |
| JP | 2015-168869 A | 9/2015 | |

OTHER PUBLICATIONS

Translation and Bib Data; JPS62151514-A; Jul. 6, 1987 (Year: 1987).*

* cited by examiner

GRAIN-ORIENTED ELECTRICAL STEEL SHEET

TECHNICAL FIELD

The present invention relates to a grain-oriented electrical steel sheet that is used as an iron core material of transformers and particularly to a tension-insulation coating-attached grain-oriented electrical steel sheet having excellent adhesion of the tension-insulation coating.

Priority is claimed on Japanese Patent Application No. 2019-005475, filed Jan. 16, 2019, the content of which is incorporated herein by reference.

BACKGROUND ART

Grain-oriented electrical steel sheets are mainly used in transformers. Transformers are continuously excited for a long period of time from installation to disposal and continuously cause energy losses, and thus energy losses caused when transformers are magnetized by alternating currents, that is, iron losses, serve as a critical index for determining the performance of transformers.

In order to reduce the iron losses of grain-oriented electrical steel sheets, a number of techniques have been thus far developed from the viewpoint of (a) increasing accumulation in a {110}<001> orientation (Goss orientation), (b) increasing the electrical resistances of steel sheets by increasing the content of an element that forms a solid solution such as Si, or (c) thinning the sheet thicknesses of electrical steel sheets.

In addition, the application of tension to steel sheets is effective for the reduction of iron losses, and it is effective means to form a coating of a material having a smaller thermal expansion coefficient than steel sheets on the steel sheet surface at high temperatures for the reduction of iron losses. Forsterite films having excellent coating adhesion, which are generated by a reaction between an oxide on the steel sheet surface and an annealing separating agent in final annealing processes of electrical steel sheets, are films capable of applying tension to steel sheets.

Additionally, a method that is disclosed in Patent Document 1 in which a coating fluid mainly containing colloidal silica and phosphate is baked on a steel sheet surface to form an insulation coating is an effective method for the reduction of iron losses since the effect of applying tension is strong. Therefore, in ordinary methods for manufacturing a grain-oriented electrical steel sheet, a forsterite film generated in a final annealing process is left, and an insulation coating mainly containing phosphate is provided.

However, it has been clarified that forsterite films hinder the movement of magnetic domain walls and adversely affect iron losses. In grain-oriented electrical steel sheets, magnetic domains change due to the movement of magnetic domain walls under an alternating magnetic field. The smooth and rapid movement of these magnetic domain walls is effective for the reduction of iron losses, but forsterite films have an uneven structure in the steel sheet/film interfaces, and the uneven structure hinders the movement of magnetic domain walls, and thus forsterite films adversely affect iron losses.

Therefore, techniques for suppressing the formation of forsterite films and smoothing base steel sheet surfaces have been developed. For example, Patent Documents 2 to 5 disclose techniques in which the atmosphere dew point of decarburization annealing is controlled and alumina is used as an annealing separating agent to smooth a base steel sheet surface without forming a forsterite film by final annealing.

In the case of smoothing the steel sheet surface as described above, there is a need to form a tension-insulation coating having sufficient adhesion on the base steel sheet surface in order to apply tension to the base steel sheet. Patent Document 6 discloses a method in which an amorphous oxide layer is formed on a base steel sheet surface and then a tension-insulation coating is formed. Patent Documents 7 to 11 disclose techniques of controlling the structure of an amorphous oxide layer for the purpose of forming a tension-insulation coating having higher adhesion.

A method described in Patent Document 7 is a method in which a structure having an externally oxidized granular oxide mainly containing silica and penetrating a film thickness of an external oxide film is provided and adhesion between a tension-insulation coating and a base steel sheet is ensured by performing a pretreatment for introducing fine unevenness on a surface of a grain-oriented electrical steel sheet having a smoothened base steel sheet surface, then, forming an external oxidation-type oxide.

A method described in Patent Document 8 is a method in which, in a heat treatment process of forming an externally oxidized layer on a grain-oriented electrical steel sheet having a smoothened base steel sheet surface, a temperature rise rate in a temperature rise region of 200° C. or higher and 1150° C. or lower is controlled to be 10° C./second or faster and 500° C./second or slower, and a cross-sectional area rate of a metal-based oxide of iron, aluminum, titanium, manganese, chromium, or the like in an external oxide film is set to 50% or less, thereby ensuring adhesion between a tension-insulation coating and a base steel sheet.

A method described in Patent Document 9 is a method in which an externally oxidized layer is formed on a grain-oriented electrical steel sheet having a smoothened base steel sheet surface, and in a subsequent tension-insulation coating formation process, the contact time between the externally oxidized layer-attached steel sheet and a coating fluid for forming a tension-insulation coating is set to 20 seconds or less, thereby setting the rate of a density-decreasing layer in the externally oxidized layer to 30% or less and ensuring adhesion between a tension-insulation coating and the base steel sheet.

A method described in Patent Document 10 is a method in which a heat treatment for forming an externally oxidized layer on a grain-oriented electrical steel sheet having a smoothened base steel sheet surface is performed at a temperature of 1000° C. or higher, a cooling rate in a temperature region from an externally oxidized layer formation temperature to 200° C. is controlled to be 100° C./second or slower, and a cross-sectional area rate of cavities in the externally oxidized layer is set to 30% or less, thereby ensuring adhesion between a tension-insulation coating and a base steel sheet.

A method described in Patent Document 11 is a method in which, in a heat treatment process of forming an externally oxidized layer on a grain-oriented electrical steel sheet having a smoothened base steel sheet surface, annealing is performed under conditions of a heat treatment temperature of 600° C. or higher and 1150° C. or lower and an atmosphere dew point of −20° C. or higher and 0° C. or lower and conditions of a dew point of the cooling atmosphere at that time of 5° C. or higher and 60° C. or lower, and metallic iron is contained in a cross-sectional area rate in the externally oxidized layer of 5% or more and 30% or less, thereby ensuring adhesion between a tension-insulation coating and a base steel sheet.

CITATION LIST

Patent Document

[Patent Document 1]
Japanese Unexamined Patent Application, First Publication No. S48-039338
[Patent Document 2]
Japanese Unexamined Patent Application, First Publication No. H07-278670
[Patent Document 3]
Japanese Unexamined Patent Application, First Publication No. H11-106827
[Patent Document 4]
Japanese Unexamined Patent Application, First Publication No. H07-118750
[Patent Document 5]
Japanese Unexamined Patent Application, First Publication No. 2003-268450
[Patent Document 6]
Japanese Unexamined Patent Application, First Publication No. H07-278833
[Patent Document 7]
Japanese Unexamined Patent Application, First Publication No. 2002-322566
[Patent Document 8]
Japanese Unexamined Patent Application, First Publication No. 2002-348643
[Patent Document 9]
Japanese Unexamined Patent Application, First Publication No. 2003-293149
[Patent Document 10]
Japanese Unexamined Patent Application, First Publication No. 2002-363763
[Patent Document 11]
Japanese Unexamined Patent Application, First Publication No. 2003-313644

SUMMARY OF THE INVENTION

Problems to be Solved by the Invention

However, even in all of the methods of Patent Documents 7 to 11, there is a case where the expected iron loss reduction effect does not sufficiently develop.

The present invention has been made in consideration of the current situation of the related art, and a purpose of the present invention is to provide a grain-oriented electrical steel sheet capable of attaining the following object. The object is to enhance adhesion between a tension-insulation coating and a base steel sheet at the time of coating a surface of the grain-oriented electrical steel sheet in which a forsterite film is removed or the generation of forsterite is intentionally prevented, whereby no forsterite film is present on the base steel sheet surface with the tension-insulation coating, and to reduce iron losses.

Means for Solving the Problem

The present inventors intensively studied a method for attaining the above-described object. As a result, it was found that, in a tension-insulation coating-attached grain-oriented electrical steel sheet in which a forsterite film is removed or the generation of forsterite is intentionally prevented, whereby no forsterite film is present on a base steel sheet surface, and a surface of the grain-oriented electrical steel sheet is coated with a tension-insulation coating, when glossiness at an incident angle of 20 degrees (Gs20), which is measured according to JIS Z 8741, is set to 2.0 or more and 70.0 or less both in a rolling parallel direction and in a rolling perpendicular direction, sufficient adhesion of the tension-insulation coating can be obtained, and the iron loss is significantly reduced.

The present invention has been made based on the above-described finding, and the gist of the present invention is as described below.

(1) According to one aspect of the present invention, there is provided a grain-oriented electrical steel sheet according to one aspect of the present invention having a base steel sheet, an amorphous oxide layer formed on the base steel sheet, and a tension-insulation coating formed on the amorphous oxide layer, in which the base steel sheet contains, as a chemical composition, by mass %, C: 0.085% or less, Si: 0.80 to 7.00%, Mn: 1.50% or less, acid-soluble Al: 0.065% or less, S: 0.013% or less, Cu: 0 to 0.80%, N: 0 to 0.012%, P: 0 to 0.50%, Ni: 0 to 1.00%, Sn: 0 to 0.30%, and Sb: 0 to 0.30%, a remainder is Fe and an impurity, a surface glossiness Gs20(A) in a direction parallel to a rolling direction is 2.0 to 70.0, and a surface glossiness Gs20(B) in a direction perpendicular to the rolling direction is 2.0 to 70.0.

(2) In the grain-oriented electrical steel sheet according to (1), the base steel sheet may contain, as the chemical composition, by mass %, Cu: 0.01 to 0.80%.

(3) In the grain-oriented electrical steel sheet according to (1) or (2), the base steel sheet may contain, as the chemical composition, by mass %, one or more of N: 0.001 to 0.012%, P: 0.010 to 0.50%, Ni: 0.010 to 1.00%, Sn: 0.010 to 0.30%, and Sb: 0.010 to 0.30%.

Effects of the Invention

According to the present invention, it is possible to provide a tension-insulation coating-attached grain-oriented electrical steel sheet having an excellent iron loss and excellent coating adhesion.

EMBODIMENTS FOR IMPLEMENTING THE INVENTION

Figure 1:
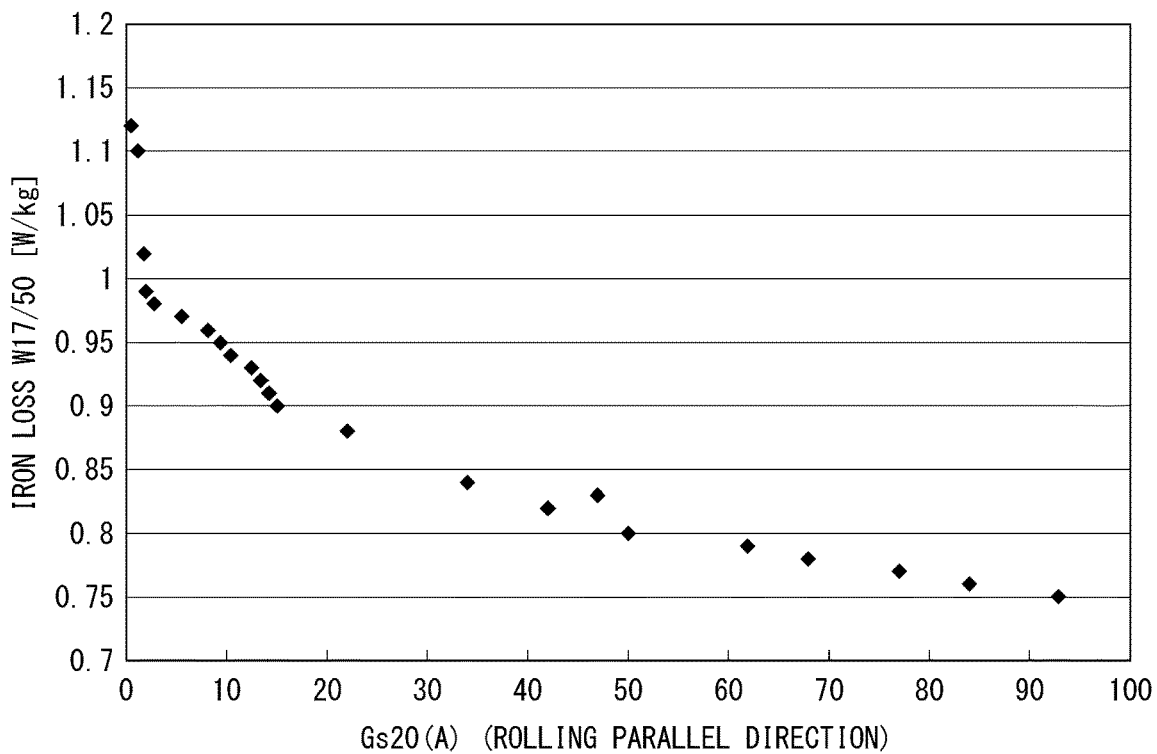
FIG. 1 is a view showing a relationship between glossiness (Gs20(A)) in a rolling parallel direction and an iron loss.

A tension-insulation coating-attached grain-oriented electrical steel sheet of the present invention (hereinafter, referred to as "present invention electrical steel sheet" in some cases) has a base steel sheet, an amorphous oxide layer formed on the base steel sheet, and a tension-insulation coating formed on the amorphous oxide layer, the base steel sheet contains, as a chemical composition, by mass %, C: 0.085% or less, Si: 0.80 to 7.00%, Mn: 1.50% or less, acid-soluble Al: 0.065% or less, S: 0.013% or less, Cu: 0 to 0.80%, N: 0 to 0.012%, P: 0 to 0.50%, Ni: 0 to 1.00%, Sn: 0 to 0.30%, and Sb: 0 to 0.30%, a remainder is Fe and an impurity, a surface glossiness Gs20(A) in a direction parallel to a rolling direction is 2.0 to 70.0, and a surface glossiness Gs20(B) in a direction perpendicular to the rolling direction is 2.0 to 70.0.

Hereinafter, regarding the present invention electrical steel sheet, an embodiment thereof will be described. In the present specification, numerical ranges expressed using "to" include numerical values before and after "to" as the lower limit value and the upper limit value. In the present specification, the term "process" refers not only to an independent process but also a process that cannot be clearly differentiated from other processes as long as the intended purpose of the process is achieved. In addition, it is evident that individual elements of the following embodiment can be combined together.

The present inventors considered that, in a grain-oriented electrical steel sheet in which the steel sheet surface on which a forsterite film is removed or the generation of forsterite is intentionally prevented, whereby no forsterite film is present, is coated with a tension-insulation coating, in order to sufficiently benefit from the iron loss reduction effect attributed to the absence of the forsterite film and make adhesion between a base steel sheet and the tension-insulation coating favorable, it is important to make the morphology of an amorphous oxide layer that is formed in the interface between the steel sheet surface and the tension-insulation coating and serves as an adhesive layer uniform and flat and to form the tension-insulation coating to be uniform and flat on the amorphous oxide layer.

However, between the amorphous oxide layer and the tension-insulation coating, particularly, the amorphous oxide layer has a thickness that is as extremely thin as several nanometers, and it is extremely difficult to determine whether or not the morphology is uniform and flat. Therefore, the present inventors studied a method for evaluating the uniformity and flatness of the amorphous oxide layer and the tension-insulation coating and found that it is possible to evaluate the uniformity and flatness of the amorphous oxide layer and the tension-insulation coating using the glossiness of the surface of the grain-oriented electrical steel sheet (that is, the surface of the tension-insulation coating).

Based on the above-described idea, the present inventors performed the following experiments and investigated the relationship between the iron losses of the tension-insulation coating-attached grain-oriented electrical steel sheet and the glossiness of the surface of the grain-oriented electrical steel sheet.

As a material for the experiments, a grain-oriented electrical steel sheet on which no forsterite film was formed was prepared by applying an annealing separating agent mainly containing alumina to a decarburization-annealed sheet having a sheet thickness of 0.23 mm, performing final annealing, and causing secondary recrystallization. On this steel sheet, a heat treatment was performed for a soaking time of 10 seconds in an atmosphere containing nitrogen (25%) and hydrogen (75%) and having a dew point of −30° C. to 5° C., thereby forming an amorphous oxide layer mainly containing silica on the steel sheet surface. A coating fluid mainly containing phosphate, chromic acid, and colloidal silica was applied to this steel sheet with a groove-attached coating roll having a groove width of 1.27 mm and a groove depth of 0.90 mm, and a heat treatment was performed in a nitrogen and hydrogen-mixed atmosphere at an oxygen partial pressure ($P_{H2O}/P_{H2}$) in a range of 0.01 to 0.45 under conditions of a temperature of 850° C. and a soaking time of 30 seconds, thereby forming a tension-insulation coating.

The glossiness of the surface of the tension-insulation coating-attached grain-oriented electrical steel sheet was measured in a rolling parallel direction and in a rolling perpendicular direction by a method specified by JIS Z 8741 (a method in which a value (Gs20) obtained by measuring a black glass standard plate (refractive index 1.567) at an incidence angle of 20° is defined as 100, and the glossiness is specified). In some cases, Gs20 measured in a direction parallel to a rolling direction will be referred to as Gs20(A), and Gs20 measured in a direction perpendicular to the rolling direction will be referred to as Gs20(B).

Next, the iron loss (W17/50) in the tension-insulation coating-attached grain-oriented electrical steel sheet was investigated.

Figure 2:
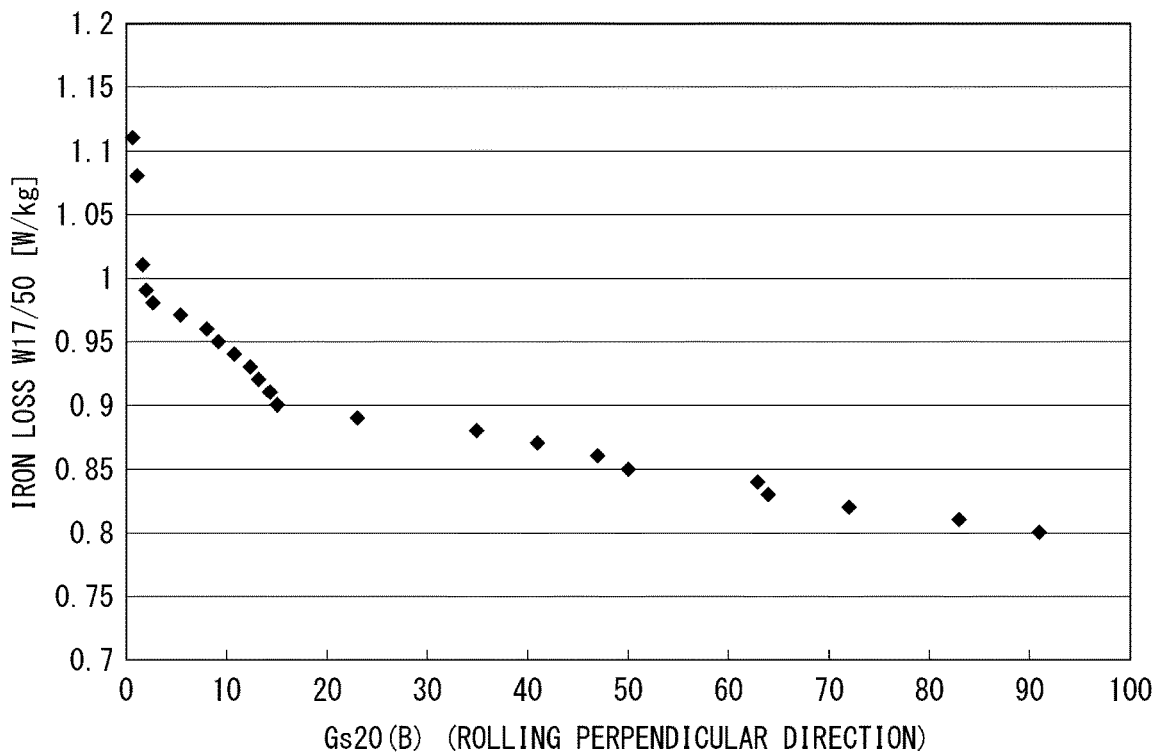
FIG. 2 is a view showing a relationship between glossiness (Gs20(B)) in a rolling perpendicular direction and the iron loss.

FIG. 1 shows the relationship between the glossiness (Gs20(A)) in the rolling parallel direction (the direction parallel to the rolling direction) and the iron loss, and FIG. 2 shows the relationship between the glossiness (Gs20(B)) in the rolling perpendicular direction (the direction perpendicular to the rolling direction) and the iron loss. From FIG. 1 and FIG. 2, conditions under which favorable iron losses of the tension-insulation coating-attached grain-oriented electrical steel sheet can be ensured are expressed as described below.

(i) When the glossiness (Gs20(A)) in the rolling parallel direction and the glossiness (Gs20(B)) in the rolling perpendicular direction are two or more, the iron loss becomes less than 1.00 W/kg, and the iron loss is favorable.

(ii) When the glossiness (Gs20(A)) in the rolling parallel direction and the glossiness (Gs20(B)) in the rolling perpendicular direction are 15 or more, the iron loss becomes less than 0.90 W/kg, and the iron loss is more favorable.

Based on the above-described results, in the present grain-oriented electrical steel sheet, the glossiness (Gs20(A) and Gs20(B)) measured from the surface of the tension-insulation coating is specified as two or more. The glossiness is preferably 15 or more.

[Base Steel Sheet]

The grain-oriented electrical steel sheet according to the present embodiment includes a base steel sheet. First, the component composition of the base steel sheet will be described. Hereinafter, "%" relating to the component composition indicates "mass %".

<Component Composition>

C: 0.085% or Less

C is an effective element for the control of the primary recrystallization structure, but is an element increasing the iron loss by magnetic aging. Therefore, it is necessary to decrease the C content to less than 0.010% by decarburization annealing before final annealing.

When the C content exceeds 0.085%, since a long period of time is required for decarburization annealing, and the productivity decreases, the C content is set to 0.085% or less. The C content is preferably 0.070% or less and more preferably 0.050% or less. The lower limit is not particularly limited, but is preferably 0.050% or more from the viewpoint of stably controlling the primary recrystallization structure.

Si: 0.80 to 7.00%

Si is an element which increases the electrical resistance of the steel sheet and decreases the iron loss. When the Si content is less than 0.80%, the effect of Si contained cannot be sufficiently obtained. In addition, phase transformation occurs during secondary recrystallization annealing, it is not possible to precisely control secondary recrystallization, the crystal orientations are impaired, and the magnetic characteristics degrade. Therefore, the Si content is set to 0.80% or more. The Si content is preferably 2.50% or more and more preferably 3.00% or more.

On the other hand, when the Si content exceeds 7.00%, the steel sheet becomes brittle, cold rolling becomes difficult, and cracks are generated during rolling. Therefore, the Si content is set to 7.00% or less. The Si content is preferably 4.00% or less and more preferably 3.75% or less.

Mn: 1.50% or Less

When the Mn content exceeds 1.50%, phase transformation occurs during secondary recrystallization annealing, and a favorable magnetic flux density cannot be obtained. Therefore, the Mn content is set to 1.50% or less. The Mn content is preferably 1.20% or less and more preferably 0.90% or less.

Meanwhile, Mn is an austenite-forming element and an element which contributes to the reduction of the iron loss by increasing the specific resistance of the steel sheet. When the Mn content is less than 0.01%, the effect of Mn contained cannot be sufficiently obtained, and the steel sheet becomes brittle during hot rolling. Therefore, the Mn content is preferably 0.01% or more. The Mn content is more preferably 0.05% or more and still more preferably 0.10% or more.

Acid-Soluble Al: 0.065% or Less

When Al exceeds 0.065%, coarse (Al, Si)N is precipitated or the precipitation of (Al, Si)N becomes nonuniform. As a result, a required secondary recrystallization structure cannot be obtained, and the magnetic flux density decreases. Therefore, the acid-soluble Al content is set to 0.065% or less. The acid-soluble Al content is preferably 0.055% or less and more preferably 0.045% or less. The Al content may be 0%.

Meanwhile, acid-soluble Al is an element which bonds to N and forms (Al, Si)N functioning as an inhibitor. Therefore, when acid-soluble Al is less than 0.010% in a slab that is used for manufacturing, a sufficient amount of (Al, Si)N is not formed, and secondary recrystallization does not become stable. Therefore, acid-soluble Al in the slab that is used for manufacturing is preferably set to 0.010% or more, and this Al may remain in the steel sheet. The acid-soluble Al content in the slab is more preferably 0.002% or more and more preferably 0.030% or more.

S: 0.013% or Less

When the S content exceeds 0.013%, the precipitation dispersion of MnS becomes nonuniform, a required secondary recrystallization structure cannot be obtained, and the magnetic flux density decreases. Therefore, S is set to 0.013% or less. The S content is preferably 0.012% or less and more preferably 0.011% or less. Meanwhile, S is an element which bonds to Mn and forms MnS functioning as an inhibitor. Therefore, in the slab that is used for manufacturing, the S content is preferably set to 0.003% or more, and this S may remain in the steel sheet. The S content in the slab that is used for manufacturing is more preferably 0.005% or more and still more preferably 0.008% or more.

The base steel sheet according to the present embodiment may contain, in addition to the above-described elements, in order to improve a variety of characteristics, in addition to the above-described element, (a) Cu: 0.01 to 0.80% and/or (b) one or more of N: 0.001 to 0.012%, P: 0.010 to 0.50% or less, Ni: 0.010 to 1.00% or less, Sn: 0.010 to 0.30% or less, and Sb: 0.010 to 0.30% or less. These elements do not need to be contained at all times, and thus the lower limits of their contents are 0%.

(a) Element

Cu: 0 to 0.80%

Cu is an element which bonds to S and forms a precipitate functioning as an inhibitor. When the Cu content is less than 0.01%, since the effect does not sufficiently develop, Cu is preferably 0.01% or more. The Cu content is more preferably 0.04% or more.

On the other hand, when the Cu content exceeds 0.80%, since the dispersion of a precipitate becomes nonuniform, and the iron loss reduction effect is saturated, the Cu content is preferably 0.80% or less. The Cu content is more preferably 0.60% or less.

(b) Group Elements

N: 0 to 0.0120%

N is an element which bonds to Al and forms AN functioning as an inhibitor.

When the N content is less than 0.001%, since the formation of AlN becomes insufficient, the N content is preferably 0.001% or more. The N content is more preferably 0.006% or more. Meanwhile, N is also an element which forms a blister (void) in the steel sheet during cold rolling. When the N content exceeds 0.0120%, since there is a concern that a blister (void) may be generated in the steel sheet during cold rolling, the N content is preferably 0.012% or less. The N content is more preferably 0.009% or less.

P: 0 to 0.50%

P is an element which contributes to the reduction of the iron loss by increasing the specific resistance of the steel sheet. The P content is preferably 0.010% or more from the viewpoint of reliably obtaining the effect of P contained.

On the other hand, when P exceeds 0.50%, the rollability degrades. Therefore, the P content is preferably 0.50% or less. The P content is more preferably 0.35% or less. The lower limit includes 0%, but P reduced to less than 0.0005% significantly increases the manufacturing cost, and thus the substantial lower limit is 0.0005% for practical steel sheets.

Ni: 0 to 1.00%

Ni is an element which contributes to the reduction of the iron loss by increasing the specific resistance of the steel sheet and contributes to the improvement of the magnetic characteristics by controlling the metallographic structure of a hot-rolled steel sheet. The lower limit includes 0%, but the Ni content is preferably 0.010% or more from the viewpoint of reliably obtaining the effect of Ni contained.

On the other hand, when the Ni content exceeds 1.00%, secondary recrystallization proceeds unstably, and the magnetic characteristics degrade. Therefore, the Ni content is preferably 1.00% or less. The Ni content is more preferably 0.35% or less.

Sn: 0 to 0.30%

Sb: 0 to 0.30%

Sn and Sb are elements which segregate in crystal grain boundaries and have an action of preventing the oxidation of Al by moisture that is emitted from an annealing separating agent during final annealing (due to this oxidation, the inhibitor intensity differs at coil positions, and the magnetic characteristics change). The lower limit includes 0%, but the contents of both elements are preferably 0.010% or more from the viewpoint of reliably obtaining the effect of both elements contained.

On the other hand, for both elements, when the contents exceed 0.30%, the secondary recrystallization becomes unstable, and the magnetic characteristics deteriorate. Therefore, for both Sn and Sb, the contents are preferably 0.30% or less. The contents are more preferably 0.25% or less for both elements.

The remainder excluding the above-described elements of the base steel sheet according to the present embodiment is Fe and an impurity. The impurity is an element which is inevitably incorporated from a steel raw material and/or a steelmaking procedure and is permitted as long as the characteristics of the electrical steel sheet according to the present embodiment are not impaired. The above-described components may be measured by an ordinary analysis method of steel. For example, a steel component may be measured using inductively coupled plasma-atomic emission spectrometry (ICP-AES). Acid-soluble Al may be measured by ICP-AES using a filtrate obtained by hydrolyzing a specimen with an acid. In addition, C and S may be measured using an infrared absorption method after combustion, and N may be measured using an inert gas fusion thermal conductivity method.

[Amorphous Oxide Layer]

The grain-oriented electrical steel sheet according to the present embodiment includes an amorphous oxide layer on the above-described base steel sheet. The amorphous oxide layer refers to a layer made of only a substantially amorphous oxide. Whether or not the layer has an oxide can be confirmed using a TEM or FT-IR.

Here, an amorphous substance refers to a solid in which atoms or molecules do not form a regular space lattice, but are arrayed in a disordered manner. Specifically, at the time of performing X-ray diffraction, a state in which only haloes are detected and no specific peaks are detected is shown.

The amorphous oxide layer is not an internal oxidation-type layer, but preferably an external oxidation-type layer. The internal oxidation-type amorphous oxide layer refers to a layer in which some of an amorphous oxide intrudes into the interface between the steel sheet and the amorphous oxide and an aspect ratio represented by the ratio between the length of the intrusion portion in the depth direction and the length of the bottom side of the intrusion portion is 1.2 or more, and the external oxidation-type amorphous oxide layer refers to a layer in which the aspect ratio is less than 1.2. When the internal oxidation-type amorphous oxide layer is formed instead of the external oxidation-type amorphous oxide layer, there is a case where the tension-insulation coating peels off from the intrusion portion as the point of origin.

[Tension-Insulation Coating]

The grain-oriented electrical steel sheet according to the present embodiment includes a tension-insulation coating on the above-described amorphous oxide layer. The tension-insulation coating is a vitreous insulation coating formed by the application and baking of a solution mainly containing phosphate and colloidal silica ($SiO_2$). This tension-insulation coating enables the application of high surface tension to the base steel sheet.

(Method for Manufacturing Grain-Oriented Electrical Steel Sheet)

Next, a method for manufacturing the grain-oriented electrical steel sheet according to the present embodiment will be described.

In the method for manufacturing the grain-oriented electrical steel sheet according to the present embodiment, a slab having required components that has been melted and cast by ordinary methods is used. The component composition of the slab according to the present embodiment (present invention slab) will be described.

<Component Composition of Slab>

C: 0.085% or Less

C is an element which significantly deteriorates the iron loss characteristics by magnetic aging. When the C content exceeds 0.085%, since C remains even after decarburization annealing and deteriorates the iron loss characteristics, C is set to 0.085% or less. C is preferably as small as possible from the viewpoint of the iron loss characteristics, but the detection limit is approximately 0.0001%, and thus the substantial lower limit is 0.0001%. From the viewpoint of iron loss characteristic improvement, C is preferably 0.010% or less and more preferably 0.005% or less.

Si: 0.80 to 7.00%

Si is an element which contributes to the improvement of the magnetic characteristics. When the Si content is less than 0.80%, since the phase transformation of steel occurs during secondary recrystallization annealing, it is not possible to control secondary recrystallization, and a favorable magnetic flux density and favorable iron loss characteristics cannot be obtained, Si is set to 0.80% or more. The Si content is preferably 2.50% or more and more preferably 3.00% or more.

On the other hand, when the Si content exceeds 7.00%, since the steel sheet becomes brittle, and the passability in manufacturing processes significantly deteriorates, Si is set to 7.00% or less. The Si content is preferably 4.00% or less and more preferably 3.75% or less.

Mn: 0.01 to 1.50%

Mn is an austenite formation element. When the Mn content is less than 0.01%, since the effect of Mn added cannot be sufficiently obtained, and the steel sheet becomes brittle during hot rolling, Mn is set to 0.01% or more. The Mn content is preferably 0.05% or more and more preferably 0.10% or more.

On the other hand, when the Mn content exceeds 1.50%, since the phase transformation of steel occurs during secondary recrystallization annealing, and a favorable magnetic flux density and favorable iron loss characteristics cannot be obtained, Mn is set to 1.50% or less. The Mn content is preferably 0.70% or less and more preferably 0.50% or less.

Al: 0.0008 to 0.065%

Al is an element which forms AlN functioning as an inhibitor and contributes to the improvement of the magnetic characteristics.

When the Al content is less than 0.0008%, since the amount of AlN generated is small, and secondary recrystallization does not proceed sufficiently, Al is set to 0.0008% or more. The Al content is preferably 0.015% or more and more preferably 0.020% or more.

On the other hand, when the Al content exceeds 0.065%, since the steel sheet becomes brittle, the precipitation of AlN becomes nonuniform, a required secondary recrystallization structure cannot be obtained, and the magnetic flux density decreases, Al is set to 0.065% or less. The Al content is preferably 0.060% or less and more preferably 0.055% or less.

S: 0.0001 to 0.013%

S is an element which forms a fine sulfide and impairs the iron loss characteristics. S is preferably as small as possible, but the detection limit is approximately 0.0001%, and thus S is set to 0.0001% or more. The S content is preferably 0.003% or more and more preferably 0.005% or more.

On the other hand, when the S content exceeds 0.013%, since the iron loss characteristics significantly degrade, S is set to 0.013% or less. The S content is preferably 0.010% or less and more preferably 0.005% or less.

The present invention slab may contain, in addition to the above-described elements, 0.01 to 0.80% of Cu in order to improve the magnetic characteristics. Since Cu may not be contained, the lower limit of Cu is 0%.

Cu: 0.01 to 0.80%

Cu is an element which bonds to S and forms a precipitate functioning as an inhibitor. When the Cu content is less than 0.01%, since the effect of Cu added cannot be sufficiently obtained, Cu is set to 0.01% or more. The Cu content is preferably 0.04% or more and more preferably 0.08% or more.

On the other hand, when the Cu content exceeds 0.80%, since the dispersion of a precipitate becomes nonuniform, and the iron loss reduction effect is saturated, Cu is set to 0.80% or less. The Cu content is preferably 0.60% or less and more preferably 0.50% or less.

In the present invention slab, the remainder excluding the above-described elements is Fe and an impurity, and the present invention slab may contain one or more of N: 0.004 to 0.0120%, P: 0.02 to 0.50% or less, Ni: 0.02 to 1.00% or less, Sn: 0.02 to 0.30% or less, and Sb: 0.02 to 0.30% or less as long as the characteristics of the present invention electrical steel sheet are not impaired. Since these elements may not be contained, the lower limits of these elements are 0%.

N: 0.004 to 0.0120%

N is an element which forms AlN functioning as an inhibitor and also an element which forms a blister (void) in the steel sheet during cold rolling. When the N content is less than 0.004%, since the formation of AlN becomes insufficient, N is set to 0.004% or more. The N content is preferably 0.006% or more and more preferably 0.007% or more.

On the other hand, when the N content exceeds 0.0120%, since there is a concern that a blister (void) may be generated in the steel sheet during cold rolling, N is set to 0.0120% or less. The N content is preferably 0.010% or less and more preferably 0.009% or less.

P: 0.50% or Less

P is an element which contributes to the reduction of the iron loss by increasing the specific resistance of the steel sheet. When the P content exceeds 0.50%, since the rollability degrades, P is set to 0.50% or less. The P content is preferably 0.35% or less. The lower limit includes 0%, but the P content is preferably 0.02% or more from the viewpoint of reliably obtaining the effect of P added.

Ni: 1.00% or Less

Ni is an element which contributes to the reduction of the iron loss by increasing the specific resistance of the steel sheet and contributes to the improvement of the magnetic characteristics by controlling the metallographic structure of a hot-rolled steel sheet. When the Ni content exceeds 1.00%, since secondary recrystallization proceeds unstably, Ni is set to 1.00% or less. The Ni content is preferably 0.25% or less. The lower limit includes 0%, but the Ni content is preferably 0.02% or more from the viewpoint of reliably obtaining the effect of Ni added.

Sn: 0.30% or Less

Sb: 0.30% or Less

Sn and Sb are elements which segregate in crystal grain boundaries and have an action of preventing the oxidation of Al by moisture that is emitted from an annealing separating agent during final annealing (due to this oxidation, the inhibitor intensity differs at coil positions, and the magnetic characteristics change). When the contents of both elements exceed 0.30%, since an oxidation layer is less likely to be formed during decarburization annealing, and the formation of a glass film becomes insufficient, for both Sn and Sb, the contents are set to 0.30% or less. For both elements, the contents are preferably 0.25% or less. The lower limits include 0%, but the contents of both elements are preferably 0.02% or more from the viewpoint of reliably obtaining the effect of these elements added.

Next, the slab having the above-described component composition is subjected to ordinary hot rolling and coiled as a hot-rolled coil (hot rolling process). Subsequently, the hot-rolled coil is uncoiled, subjected to hot band annealing (hot-band annealing process), after that, subject to cold rolling once or a plurality of times of cold rolling including intermediate annealing to produce a base steel sheet having a final sheet thickness (cold rolling process), and decarburization annealing is performed thereon.

In the decarburization annealing, the base steel sheet is heated in wet hydrogen, whereby C in the base steel sheet is reduced to a region where the deterioration of the magnetic characteristics attributed to magnetic aging does not occur in the base steel sheet in products, and primary recrystallization is caused to prepare secondary recrystallization (decarburization annealing process).

In addition, in the decarburization annealing process, furthermore, a nitriding treatment may be performed once or more any time before, during, and after the above-described holding. In the nitriding treatment, the cold-rolled steel sheet is annealed in an atmosphere containing ammonia and is nitrided. In a case where the slab heating temperature is low, the decarburization annealing process preferably includes the nitriding treatment. When the nitriding treatment is further performed in the decarburization annealing process, an inhibitor such as AlN or (Al, Si)N is generated before secondary recrystallization in a final annealing process, and thus it is possible to stably develop secondary recrystallization.

The conditions of the nitriding treatment are not particularly limited, but the nitriding treatment is preferably performed such that the nitrogen content increases by 0.003% or more, preferably by 0.005% or more, and more preferably by 0.007% or more. When the nitrogen (N) content becomes 0.030% or more, the effect is saturated, and thus the nitriding treatment may be performed such that the nitrogen content becomes 0.030% or less. The conditions of the nitriding treatment are not particularly limited, and the nitriding treatment may be performed under well-known conditions. For example, in the case of performing the nitriding treatment after holding the oxidation degree ($PH_2O/PH_2$) within a range of 0.01 to 0.15 at 750° C. to 900° C. for 10 to 600 seconds, the nitriding treatment is performed by holding the cold-rolled steel sheet in an atmosphere containing ammonia in a temperature fall procedure without cooling the cold-rolled steel sheet to room temperature. In the temperature fall procedure, the oxidation degree ($PH_2O/PH_2$) is preferably set within a range of 0.0001 to 0.01. In the case of performing the nitriding treatment while holding the oxidation degree ($PH_2O/PH_2$) within a range of 0.01 to 0.15 at 750° C. to 900° C. for 10 to 600 seconds, ammonia may be introduced into an atmospheric gas having this oxidation degree.

Subsequently, final annealing is performed on the base steel sheet at a temperature of 1100° C. or higher. The final annealing is performed on the base steel sheet in a coiled form, but is performed by applying an annealing separating agent mainly containing $Al_2O_3$ to the base steel sheet surface for the purpose of the prevention of the baking of the base steel sheet and the formation of a primary coating (final annealing process).

After the end of the final annealing, the extra annealing separating agent is removed from the base steel sheet by water washing, next, annealing is performed on the base steel sheet in a hydrogen and nitrogen-mixed atmosphere having an adjusted oxygen partial pressure ($P_{H2O}/P_{H2}$), and an amorphous oxide layer is formed on the base steel sheet surface (coating formation process).

Since the glossiness affects the iron loss, it is also important to control the oxygen partial pressure ($P_{H2O}/P_{H2}$) of the annealing atmosphere in which the amorphous oxide layer is formed. Therefore, the relationship between the oxygen partial pressure ($P_{H2O}/P_{H2}$) of the annealing atmosphere at the time of forming the amorphous oxide layer and the glossiness (Gs20(A)) in the rolling parallel direction from the steel sheet surface that has been coated with the tension-insulation coating was investigated.

Figure 3:
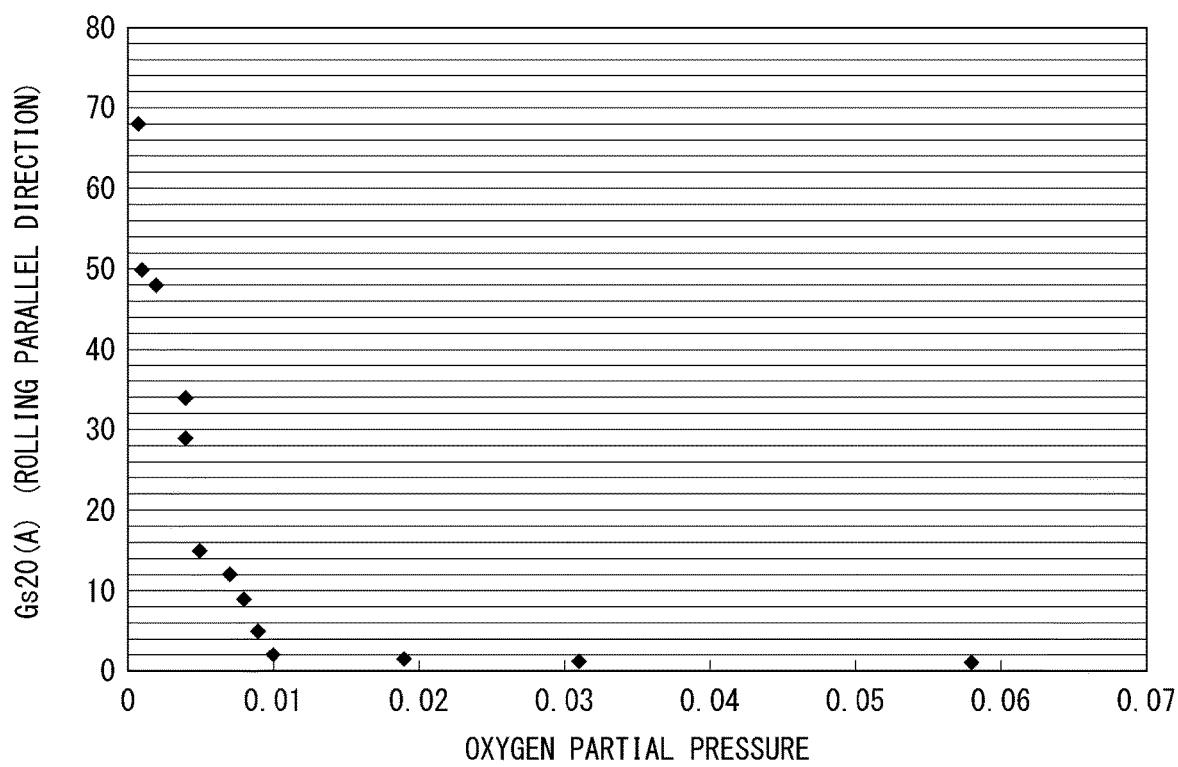
FIG. 3 is a view showing a relationship between an oxygen partial pressure ($P_{H2O}/P_{H2}$) of an annealing atmosphere for forming an amorphous oxide layer and glossiness (Gs20).

From FIG. 3, it is found that the oxygen partial pressure ($P_{H2O}/P_{H2}$) of the annealing atmosphere in which an amorphous oxide layer having a glossiness (Gs20(A)) in the rolling parallel direction of 2.0 or more is formed is 0.01 or less, the oxygen partial pressure ($P_{H2O}/P_{H2}$) of the annealing atmosphere in which an amorphous oxide layer having a glossiness (Gs20(A)) in the rolling parallel direction of 15 or more is formed is 0.005 or less, and furthermore, the oxygen partial pressure ($P_{H2O}/P_{H2}$) of the annealing atmosphere in which an amorphous oxide layer having a glossiness (Gs20 (A)) in the rolling parallel direction of 50 or more is formed is 0.001 or less.

On the other hand, in a case where the glossiness (Gs20 (A)) in the rolling parallel direction exceeds 70, the adhesion of the tension-insulation coating degraded. The mechanism thereof is not clear, but it is considered that, in a case where the flatness of the steel sheet surface is too high, the anchor effect of the tension-insulation coating can be rarely obtained, and thus the adhesion degraded.

Although the results are not shown, the glossiness (Gs20 (B)) in the rolling perpendicular direction also showed the same results as Gs20(A).

In the annealing in which the amorphous oxide layer is formed, the annealing temperature is preferably 600° C. to 1150° C. and more preferably 700° C. to 900° C. In addition, the glossiness may be set within a desired range without performing the annealing after the final annealing by adjusting the oxygen partial pressure in the above-described intermediate annealing or final annealing.

In order to control the morphology of the external oxidation-type amorphous oxide layer in which the aspect ratio of the amorphous oxide is less than 1.2 to be uniform, the oxygen partial pressure ($P_{H2O}/P_{H2}$) during annealing cooling is preferably set to 0.005 or less.

Next, a coating fluid for a tension-insulation coating is applied onto the base steel sheet having the amorphous oxide layer formed thereon with a groove-attached coating roll and is baked (baking process).

The groove width of the coating roll that is used at the time of applying the coating fluid for the tension-insulation coating is set to 0.5 to 2.6 mm. This is because, when the groove with of the coating roll is within the above-described range, it is possible to uniformly apply the coating fluid, and consequently, the tension-insulation coating is uniformly formed. A preferred range of the groove width is 1.0 to 2.0 mm.

In addition, the depth of the groove of the coating roll is set to 0.2 to 1.0 mm. When the depth of the groove of the coating roll is within the above-described range, similar to the case of the groove pitch, it is possible to uniformly apply the coating fluid and, consequently, to uniformly form the tension-insulation coating. A preferred range of the depth of the groove is 0.3 to 0.8 mm.

The control of the groove width of the coating roll or the depth of the groove of the coating roll facilitates adjustment to a desired glossiness. The formation of the tension-insulation coating slightly decreases the glossiness as the grain-oriented electrical steel sheet. In addition, in an ordinary application method, the long side direction (rolling direction) of the steel sheet and the extension direction of the groove of the coating roll become parallel to each other.

The oxygen partial pressure ($P_{H2O}/P_{H2}$) in the baking process is preferably 0.008 or more and 0.200 or less. In addition, in the baking process, the coating fluid is preferably baked under conditions of a holding temperature of 800° C. to 900° C. and a baking time of 30 to 100 seconds.

With the above-described processes, it is possible to obtain a tension-insulation coating-attached grain-oriented electrical steel sheet being excellent in terms of the iron loss and the coating adhesion.

EXAMPLES

Next, examples of the present invention will be described. Conditions in the examples are examples of conditions adopted to confirm the feasibility and effect of the present invention, and the present invention is not limited to the conditions. The present invention is capable of adopting a variety of conditions within the scope of the gist of the present invention as long as the object of the present invention is achieved.

Example 1

Silicon steel slabs having a component composition (the remainder was Fe and an impurity) shown in Table 1 were heated to 1100° C. and hot-rolled to produce hot-rolled steel sheets having a sheet thickness of 2.6 mm, the hot-rolled steel sheets were annealed at 1100° C. and then cold-rolled once to produce cold-rolled steel sheets having a final sheet thickness of 0.23 mm, and decarburization annealing and nitriding annealing were performed on the cold-rolled steel sheets.

TABLE 1

| Slab No. | Chemical component (mass %) | | | | |
| --- | --- | --- | --- | --- | --- |
| | C | Si | Mn | Al | S |
| a | 0.007 | 3.00 | 0.01 | 0.015 | 0.0050 |
| b | 0.002 | 3.80 | 1.40 | 0.025 | 0.0010 |
| c | 0.075 | 6.50 | 0.20 | 0.050 | 0.0008 |
| d | 0.002 | 3.80 | 1.40 | 0.025 | 0.0010 |

Next, an aqueous slurry of an annealing separating agent mainly containing alumina was applied to the cold-rolled steel sheets that had undergone decarburization annealing and nitriding annealing, and final annealing was performed at 1200° C. for 20 hours, thereby obtaining grain-oriented electrical steel sheets in which no forsterite film was present on the steel sheet surface having a mirror gloss and secondary recrystallization was completed.

A soaking treatment was performed on the grain-oriented electrical steel sheets in an atmosphere containing nitrogen (25%) and hydrogen (75%) and having an oxygen partial pressure ($P_{H2O}/P_{H2}$) of 0.0005 to 0.01 at 800° C. for 30 seconds, and then a heat treatment of cooling the grain-oriented electrical steel sheets to room temperature was performed in an atmosphere containing nitrogen (25%) and hydrogen (75%) and having an oxygen partial pressure ($P_{H2O}/P_{H2}$) of 0.0005 to 0.01, thereby forming amorphous oxide layers on the steel sheet surfaces. These were regarded as invention examples. In addition, as comparative examples, experiments were performed at oxygen partial pressures outside the above-described range. Table 3-3 shows the conditions of the oxygen partial pressures in individual experiment examples shown in Table 3-1 and Table 3-2.

A coating fluid for forming a tension-insulation coating containing aluminum phosphate and colloidal silica was applied to the grain-oriented electrical steel sheets having the amorphous oxide layer formed thereon with a groove-attached coating roll to which a groove having a groove width of 1.27 mm and a groove depth of 0.63 mm was attached and baked at 850° C. for 30 seconds, thereby producing tension-insulation coating-attached grain-oriented electrical steel sheets.

The component compositions (the remainder was Fe and an impurity) of base steel sheets are shown in Table 2. Numerical values with "≤" in the tables of the present examples indicate that the content was measured by performing control and manufacturing in consideration of the content, but it was not possible to obtain a sufficiently reliable measurement value as the content (the measurement result was equal to or less than the detection limit)

TABLE 2

| Steel No. | Chemical component (mass %) | | | | |
|---|---|---|---|---|---|
| | C | Si | Mn | Al | S |
| A | ≤0.002 | 3.00 | 0.01 | ≤0.002 | ≤0.0020 |
| B | ≤0.002 | 3.80 | 1.40 | ≤0.002 | ≤0.0020 |
| C | ≤0.002 | 6.50 | 0.20 | ≤0.002 | ≤0.0020 |
| D | ≤0.002 | 3.80 | 1.40 | ≤0.002 | ≤0.0020 |

The iron losses (W17/50) of specimens collected from the produced tension-insulation coating-attached grain-oriented electrical steel sheets were evaluated. A case where the iron loss was less than 0.90 W/kg was evaluated as "Good", a case where the iron loss was 0.90 or more and less than 1.00 W/kg was evaluated as "OK", and a case where the iron loss was 1.00 W/kg or more was evaluated as "NG".

The specimens collected from the produced tension-insulation coating-attached grain-oriented electrical steel sheets were coiled around a cylinder having a diameter of 20 mm (180° bent), and the coating adhesion of the tension-insulation coatings was evaluated by the area fractions of remained coating at the time of unbending the specimens. For the evaluation of the coating adhesion of the tension-insulation coatings, the presence or absence of the peeling of the tension-insulation coatings was visually determined. A case where the tension-insulation coating did not peel off from the steel sheet and the area fraction of remained coating was 90% or more was evaluated as "GOOD", a case where the area fraction of remained coating was 80% or more and less than 90% was evaluated as "OK", and a case where the area fraction of remained coating was less than 80% was evaluated as "NG".

For the glossiness of the tension-insulation coating-attached grain-oriented electrical steel sheets, the glossiness in the rolling parallel direction (Gs20(A)) and the glossiness in the rolling perpendicular direction (Gs20(B)) were measured by a method specified by JIS Z 8741 (a method in which a value obtained by measuring a black glass standard plate (refractive index 1.567) at an incidence angle of 20° is specified as 100) with a micro-tri-gloss glossmeter (4446) manufactured by BYK-Gardner.

Table 3-1 and Table 3-2 show the evaluation results of the glossiness, the iron losses, and the adhesion.

TABLE 3-1

| Base steel sheet | Manufacturing No. | Glossiness (Gs20) | | Iron loss | Adhesion | Note |
|---|---|---|---|---|---|---|
| | | Rolling parallel direction Gs20(A) | Rolling perpendicular direction Gs20(B) | | | |
| A | 1 | 0.5 | 0.3 | NG | NG | Comparative Example |
| A | 2 | 1.0 | 0.8 | NG | NG | Comparative Example |
| A | 3 | 1.8 | 1.5 | NG | NG | Comparative Example |
| A | 4 | 79.0 | 71.0 | Good | NG | Comparative Example |
| A | 5 | 2.0 | 2.0 | OK | Good | Invention Example |
| A | 6 | 6.0 | 5.0 | OK | Good | Invention Example |
| A | 7 | 8.0 | 6.0 | OK | Good | Invention Example |
| A | 8 | 14.0 | 12.0 | OK | Good | Invention Example |
| A | 9 | 15.0 | 14.0 | Good | Good | Invention Example |
| A | 10 | 50.0 | 43.0 | Good | Good | Invention Example |
| A | 11 | 70.0 | 64.0 | Good | Good | Invention Example |
| B | 1 | 0.4 | 0.3 | NG | NG | Comparative Example |
| B | 2 | 1.1 | 0.9 | NG | NG | Comparative Example |
| B | 3 | 1.9 | 1.5 | NG | NG | Comparative Example |
| B | 4 | 80.0 | 71.0 | Good | NG | Comparative Example |

TABLE 3-1-continued

| Base steel sheet | Manufacturing No. | Glossiness (Gs20) Rolling parallel direction Gs20(A) | Glossiness (Gs20) Rolling perpendicular direction Gs20(B) | Iron loss | Adhesion | Note |
|---|---|---|---|---|---|---|
| B | 5 | 3.0 | 2.0 | OK | Good | Invention Example |
| B | 6 | 6.0 | 5.0 | OK | Good | Invention Example |
| B | 7 | 12.0 | 10.0 | OK | Good | Invention Example |
| B | 8 | 14.0 | 13.0 | OK | Good | Invention Example |
| B | 9 | 18.0 | 16.0 | Good | Good | Invention Example |
| B | 10 | 29.0 | 27.0 | Good | Good | Invention Example |
| B | 11 | 64.0 | 62.0 | Good | Good | Invention Example |

TABLE 3-2

| Base steel sheet | Manufacturing No. | Glossiness (Gs20) Rolling parallel direction Gs20(A) | Glossiness (Gs20) Rolling perpendicular direction Gs20(B) | Iron loss | Adhesion | Note |
|---|---|---|---|---|---|---|
| C | 1 | 0.5 | 0.4 | NG | NG | Comparative Example |
| C | 2 | 0.9 | 0.7 | NG | NG | Comparative Example |
| C | 3 | 1.8 | 1.6 | NG | NG | Comparative Example |
| C | 4 | 77.0 | 72.0 | Good | NG | Comparative Example |
| C | 5 | 3.0 | 3.0 | OK | Good | Invention Example |
| C | 6 | 7.0 | 7.0 | OK | Good | Invention Example |
| C | 7 | 13.0 | 12.0 | OK | Good | Invention Example |
| C | 8 | 14.0 | 13.0 | OK | Good | Invention Example |
| C | 9 | 15.0 | 14.0 | Good | Good | Invention Example |
| C | 10 | 49.0 | 45.0 | Good | Good | Invention Example |
| C | 11 | 58.0 | 56.0 | Good | Good | Invention Example |
| D | 1 | 0.6 | 0.5 | NG | NG | Comparative Example |
| D | 2 | 0.8 | 0.7 | NG | NG | Comparative Example |
| D | 3 | 1.7 | 1.6 | NG | NG | Comparative Example |
| D | 4 | 74.0 | 71.0 | Good | NG | Comparative Example |
| D | 5 | 3.0 | 2.0 | OK | Good | Invention Example |
| D | 6 | 6.0 | 5.0 | OK | Good | Invention Example |
| D | 7 | 13.0 | 12.0 | OK | Good | Invention Example |
| D | 8 | 14.0 | 13.0 | OK | Good | Invention Example |
| D | 9 | 17.0 | 15.0 | Good | Good | Invention Example |
| D | 10 | 39.0 | 38.0 | Good | Good | Invention Example |
| D | 11 | 48.0 | 45.0 | Good | Good | Invention Example |

TABLE 3-3

| Manufacturing No. | Oxygen partial pressure during formation of amorphous oxide layer |
|---|---|
| 1 | 0.0500 |
| 2 | 0.0400 |
| 3 | 0.0300 |
| 4 | 0.0004 |
| 5 | 0.0100 |
| 6 | 0.0080 |
| 7 | 0.0070 |
| 8 | 0.0060 |
| 9 | 0.0040 |
| 10 | 0.0020 |
| 11 | 0.0005 |

From Table 3-1 and Table 3-2, it is found that, in a case where Gs20(A), which is the glossiness in the direction parallel to the rolling direction, and Gs20(B), which is the glossiness in the direction perpendicular to the rolling direction, are both 2.0 to 70.0, a favorable iron loss and favorable coating adhesion can be obtained.

Example 2

Silicon steel slabs having a component composition shown in Table 1 were heated to 1100° C. and hot-rolled to produce hot-rolled steel sheets having a sheet thickness of 2.6 mm, the hot-rolled steel sheets were annealed at 1100° C. and then cold-rolled once to produce cold-rolled steel sheets having a final sheet thickness of 0.23 mm, and decarburization annealing and nitriding annealing were performed on the cold-rolled steel sheets.

Next, an aqueous slurry of an annealing separating agent mainly containing alumina was applied to the cold-rolled steel sheets that had undergone decarburization annealing and nitriding annealing, and final annealing was performed at 1200° C. for 20 hours, thereby obtaining grain-oriented electrical steel sheets in which there was no forsterite film on the steel sheet surface having a mirror gloss and secondary recrystallization was completed.

A soaking treatment was performed on the grain-oriented electrical steel sheets in an atmosphere containing nitrogen (25%) and hydrogen (75%) and having an oxygen partial pressure ($P_{H_2O}/P_{H_2}$) of 0.0005 to 0.01 at 800° C. for 30 seconds, and then a heat treatment of cooling the grain-oriented electrical steel sheets to room temperature was performed in an atmosphere containing nitrogen (25%) and hydrogen (75%) and having an oxygen partial pressure ($P_{H2O}/P_{H2}$) of a value shown in Table 4, thereby forming amorphous oxide layers on the steel sheet surfaces.

A coating fluid for forming a tension-insulation coating containing aluminum phosphate and colloidal silica was applied to the grain-oriented electrical steel sheets having the amorphous oxide layer formed thereon with a groove-attached coating roll having a groove pitch and a groove depth shown in Table 4 and baked at 850° C. for 30 seconds, thereby producing tension-insulation coating-attached grain-oriented electrical steel sheets.

TABLE 4

| Manufacturing No. | Slab No. | Oxygen partial pressure during formation of amorphous oxide layer | Coating roll for forming tension-insulation coating | |
|---|---|---|---|---|
| | | | Groove width (mm) | Groove depth (mm) |
| 1 | a | 0.0080 | 3.0 | 1.5 |
| 2 | b | 0.0050 | 0.2 | 0.1 |
| 3 | c | 0.0020 | 0.5 | 0.2 |
| 4 | d | 0.0030 | 0.8 | 0.3 |
| 5 | a | 0.0040 | 1.0 | 0.3 |
| 6 | b | 0.0050 | 1.5 | 0.5 |
| 7 | c | 0.0060 | 2.0 | 0.8 |
| 8 | d | 0.0080 | 2.2 | 0.9 |
| 9 | a | 0.0080 | 2.5 | 0.9 |
| 10 | b | 0.0100 | 2.6 | 1.0 |
| 11 | a | 0.0300 | 1.0 | 0.3 |

For the individual grain-oriented electrical steel sheets manufactured under the above-described manufacturing conditions, the component compositions of the base steel sheets, the glossiness in the rolling parallel direction and in the rolling perpendicular direction, the iron losses, and the adhesion are shown in Table 5.

As shown in Table 5, in the grain-oriented electrical steel sheets for which the condition of the oxygen partial pressure ($P_{H2O}/P_{H2}$) at the time of forming the amorphous oxide layer or the conditions of the groove pitch and groove depth of the coating roller at the time of applying the coating fluid for forming a tension-insulation coating were set in the preferred ranges, the glossiness in the rolling parallel direction and in the rolling perpendicular direction was in the range of the present invention, and the iron losses and the adhesion were excellent.

INDUSTRIAL APPLICABILITY

As described above, according to the present invention, it is possible to provide a tension-insulation coating-attached grain-oriented electrical steel sheet having a favorable iron loss. Therefore, the present invention is highly available in the electrical steel sheet manufacturing industries and the electrical steel sheet using industries.

The invention claimed is:
1. A grain-oriented electrical steel sheet comprising:
a base steel sheet;
an amorphous oxide layer formed on the base steel sheet; and
a tension-insulation coating formed on the amorphous oxide layer,
wherein the base steel sheet contains, as a chemical composition, by mass %,
C: 0.085% or less,
Si: 0.80 to 7.00%,
Mn: 1.50% or less,
acid-soluble Al: 0.065% or less,
S: 0.013% or less,
Cu: 0 to 0.80%,

TABLE 5

| Product No. | Manufacturing No. | Component composition of base steel sheet (mass %) | | | | | Glossiness (Gs20) | | Iron loss | Adhesion | Note |
|---|---|---|---|---|---|---|---|---|---|---|---|
| | | | | | | | Rolling parallel direction | Rolling perpendicular direction | | | |
| | | C | Si | Mn | Al | S | Gs20(A) | Gs20(B) | | | |
| 1 | 1 | ≤0.002 | 3.00 | 0.01 | ≤0.002 | ≤0.0020 | 0.3 | 0.8 | NG | NG | Comparative Example |
| 2 | 2 | ≤0.002 | 3.80 | 1.40 | ≤0.002 | ≤0.0020 | 1.8 | 1.9 | NG | NG | Comparative Example |
| 3 | 3 | ≤0.002 | 6.50 | 0.20 | ≤0.002 | ≤0.0020 | 2.0 | 5.0 | OK | OK | Invention Example |
| 4 | 4 | ≤0.002 | 3.80 | 1.40 | ≤0.002 | ≤0.0020 | 10.0 | 14.0 | OK | OK | Invention Example |
| 5 | 5 | ≤0.002 | 3.01 | 0.02 | ≤0.002 | ≤0.0020 | 15.0 | 18.0 | Good | Good | Invention Example |
| 6 | 6 | ≤0.002 | 3.75 | 1.38 | ≤0.002 | ≤0.0020 | 50.0 | 52.0 | Good | Good | Invention Example |
| 7 | 7 | ≤0.002 | 6.45 | 0.25 | ≤0.002 | ≤0.0020 | 65.0 | 70.0 | Good | Good | Invention Example |
| 8 | 8 | ≤0.002 | 3.81 | 1.40 | ≤0.002 | ≤0.0020 | 13.0 | 12.0 | OK | OK | Invention Example |
| 9 | 9 | ≤0.002 | 3.13 | 1.11 | ≤0.002 | ≤0.0020 | 10.0 | 9.0 | OK | OK | Invention Example |
| 10 | 10 | ≤0.002 | 3.45 | 0.09 | ≤0.002 | ≤0.0020 | 8.0 | 9.0 | OK | OK | Invention Example |
| 11 | 11 | ≤0.002 | 3.01 | 0.02 | ≤0.002 | ≤0.0020 | 1.5 | 1.4 | NG | NG | Comparative Example |

N: 0 to 0.012%,
P: 0 to 0.50%,
Ni: 0 to 1.00%,
Sn: 0 to 0.30%, and
Sb: 0 to 0.30%,
a remainder is Fe and an impurity,
a surface glossiness Gs20(A) in a direction parallel to a rolling direction is 2.0 or more and less than 30.0, and a surface glossiness Gs20(B) in a direction perpendicular to the rolling direction is 2.0 or more and less than 30.0,
wherein the amorphous oxide layer is an external oxidation-type layer in which some of an amorphous oxide intrudes into an interface between the steel sheet and the amorphous oxide and an aspect ratio is less than 1.2, and
wherein the aspect ratio is represented by a ratio between the length of the intrusion portion in a depth direction and a length of a bottom side of the intrusion portion.

2. The grain-oriented electrical steel sheet according to claim 1,
wherein the base steel sheet contains, as the chemical composition, by mass %, Cu: 0.01 to 0.80%.

3. The grain-oriented electrical steel sheet according to claim 1,
wherein the base steel sheet contains, as the chemical composition, by mass %, one or more of N: 0.001 to 0.012%, P: 0.010 to 0.50%, Ni: 0.010 to 1.00%, Sn: 0.010 to 0.30%, and Sb: 0.010 to 0.30%.

4. The grain-oriented electrical steel sheet according to claim 2,
wherein the base steel sheet contains, as the chemical composition, by mass %, one or more of N: 0.001 to 0.012%, P: 0.010 to 0.50%, Ni: 0.010 to 1.00%, Sn: 0.010 to 0.30%, and Sb: 0.010 to 0.30%.

5. The grain-oriented electrical steel sheet according to claim 1,
wherein an iron loss is less than 0.90 W/kg.

* * * * *